April 14, 1953 — V. J. KOMUCHAR — 2,635,005
DUMP BODY TILTING MECHANISM
Filed Dec. 22, 1950 — 4 Sheets-Sheet 1
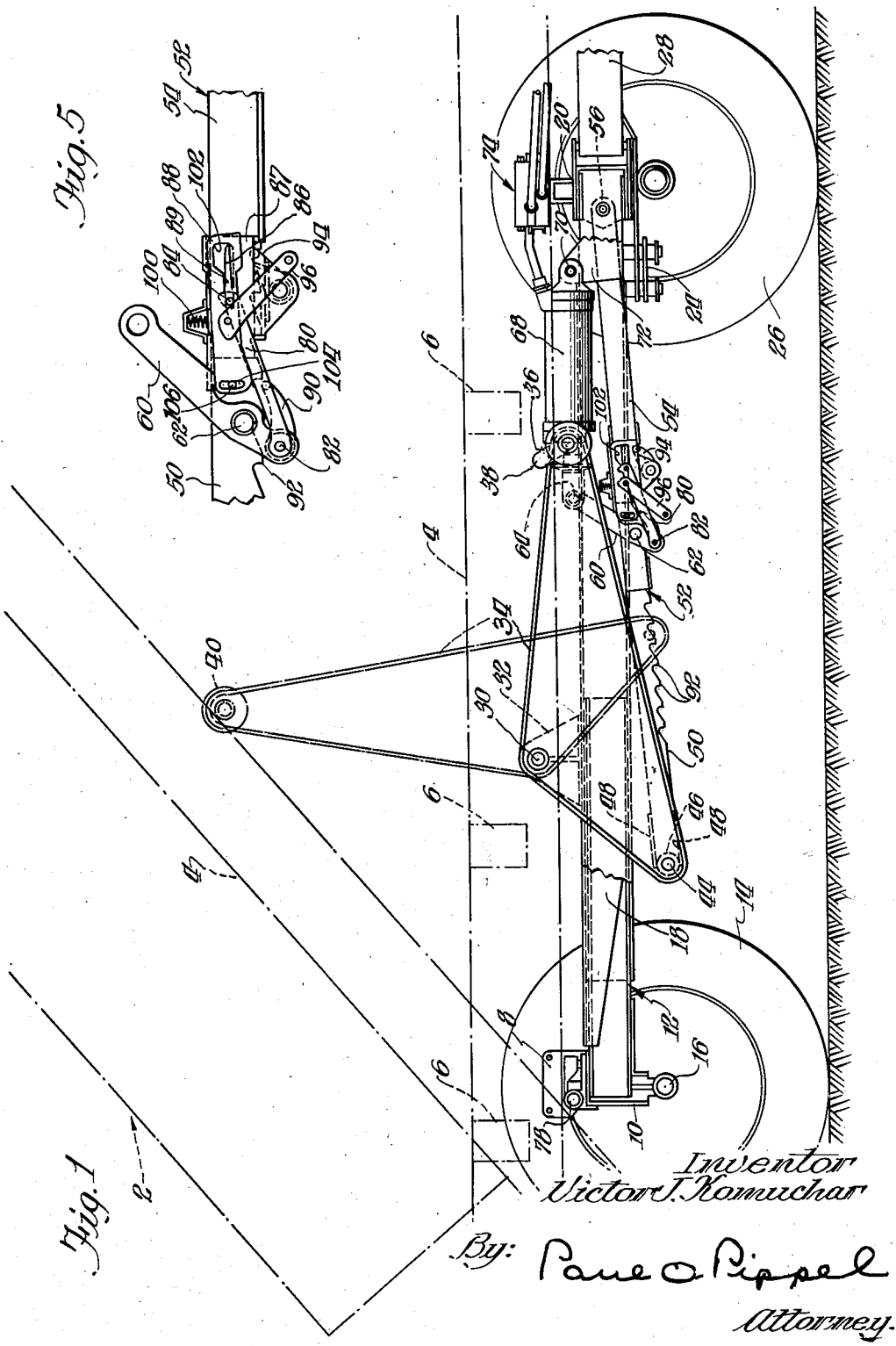
Inventor
Victor J. Komuchar
By: Paul O. Pippel
Attorney.

April 14, 1953 V. J. KOMUCHAR 2,635,005
DUMP BODY TILTING MECHANISM
Filed Dec. 22, 1950 4 Sheets-Sheet 2
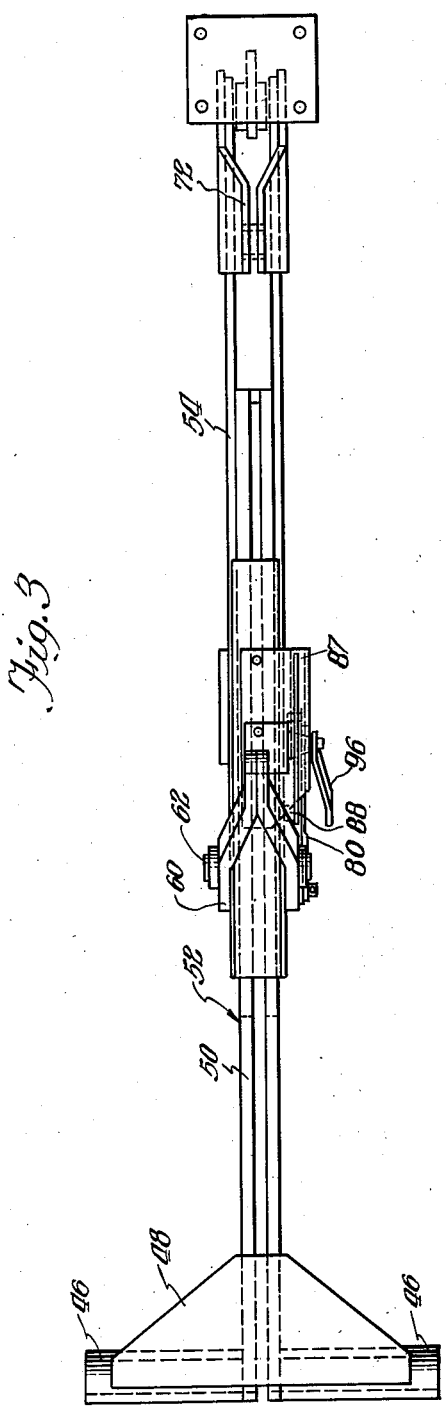
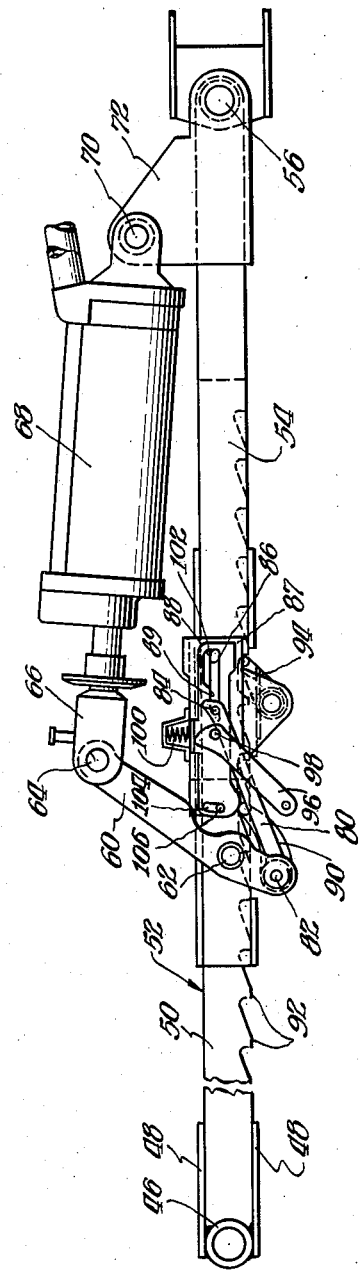
Inventor
Victor J. Komuchar
By: Paul O. Pippel
Attorney.

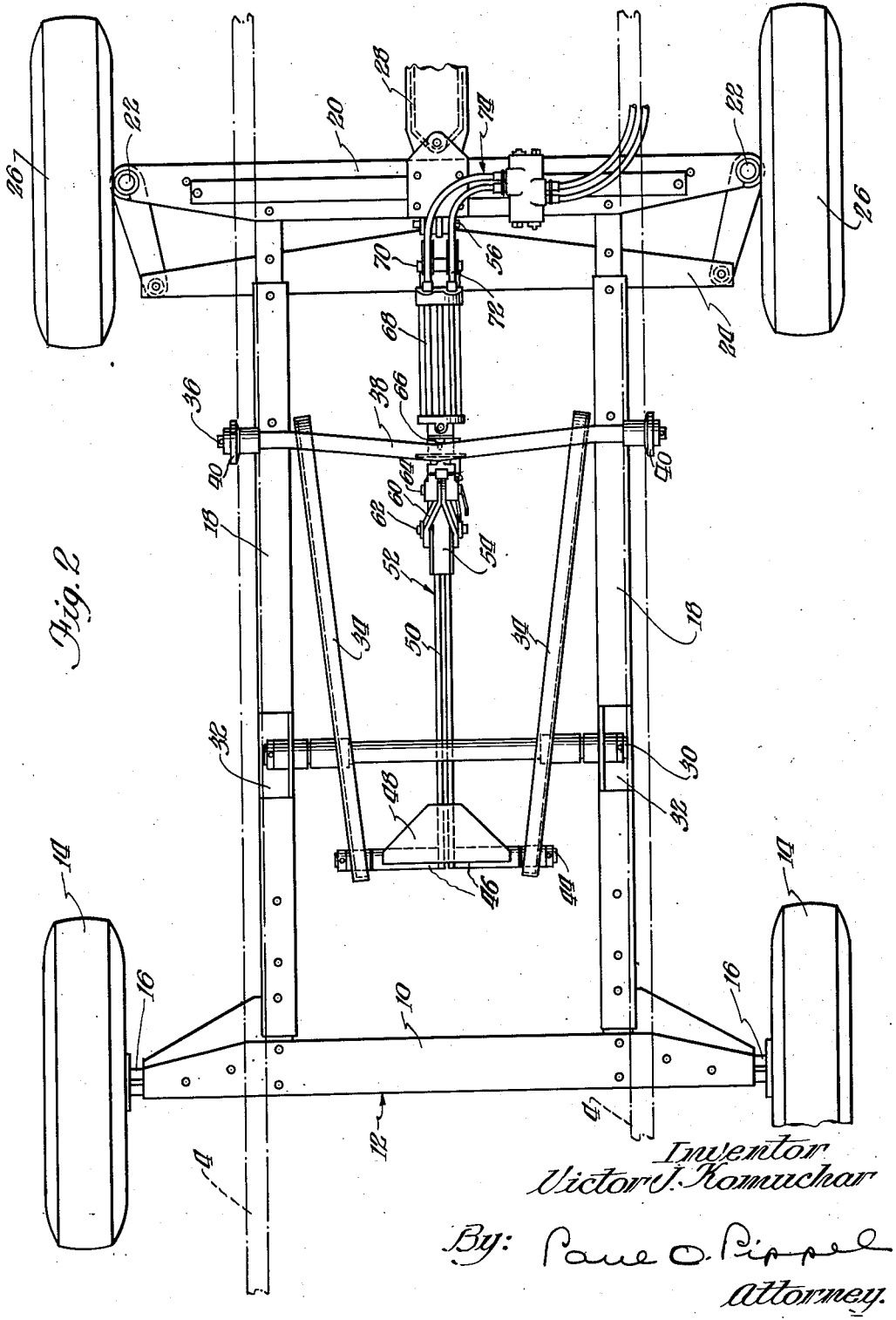

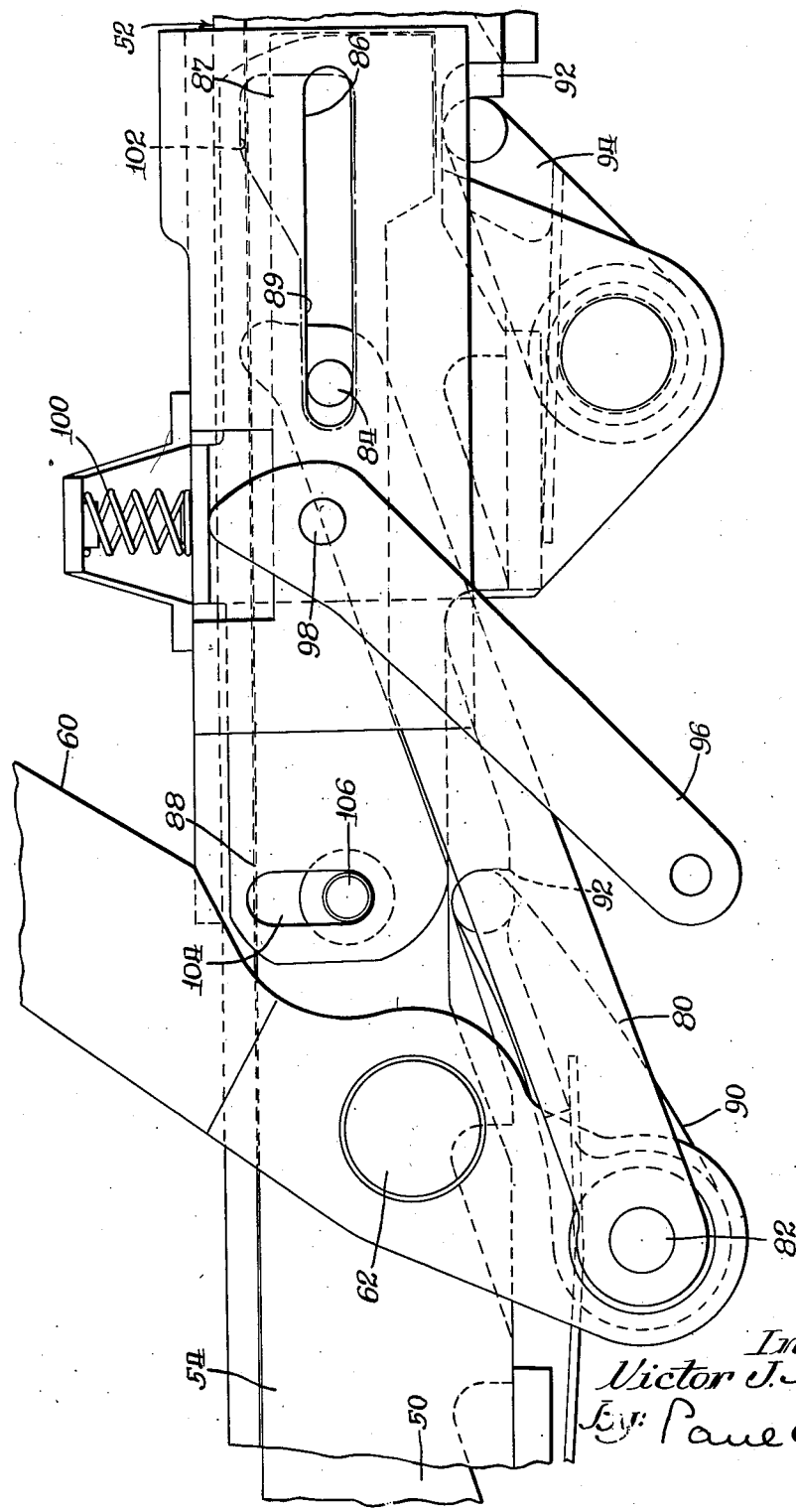

Patented Apr. 14, 1953

2,635,005

UNITED STATES PATENT OFFICE 2,635,005

DUMP BODY TILTING MECHANISM

Victor J. Komuchar, Brookfield, Ill., assignor to International Harvester Company, a corporation of New Jersey Application December 22, 1950, Serial No. 202,319

5 Claims. (Cl. 298—22)

This invention relates to load transporting vehicles or wagons and more specifically to a novel dumping arrangement therefor.

A general object of the invention is to design an arrangement for elevating the front end of a wagon box to discharge the load by gravity from the rear end thereof.

A more specific object of the invention is to provide an elevating assembly comprising a simplified lever linkage arranged between the wagon box frame and the chassis upon which the box is tiltably carried.

A further object is to develop a raising linkage which provides substantially balanced lifting forces at opposite sides of the box and thus avoids twisting of the box when the load is unevenly distributed therein.

Another object is to devise a simple lightweight lifting arrangement which may be easily installed or removed with respect to the vehicle.

The invention contemplates a compact assembly comprising lifting levers operated by a jack, the entire assembly being carried by the chassis frame of the vehicle beneath the wagon box.

A different object is to provide a lifting assembly of the type wherein the jack is coupled to a short-stroke hydraulic cylinder unit adapted to be powered by the hydraulic circuit of an associated tractor, the cylinder unit being readily disconnectable so that it may be available for use with other equipment.

A still further object of the invention is to devise the linkage in such manner that the jack, in raising and lowering the box, always acts in tension. This arrangement permits the use of a light duty jack which easily fits within the available space beneath the wagon box.

Another object of the invention is to devise a linkage which obtains maximum leverage for initial lifting of the box from its normal hauling position, the leverage progressively decreasing as the box is elevated and the speed of elevation of the box gradually increasing with each step of the jack. Such an arrangement realizes an efficient utilization of the mechanism and takes advantage of the condition that as the box is elevated higher and higher, the load is decreased by being discharged from the rear end of the box, thus permitting smaller leverage and faster elevation without overstressing the parts. Similarly, as the box is lowered the movement becomes more gentle as the box assumes hauling position.

These and other objects of the invention will become more apparent from the specification and drawings, wherein:

Fig. 1 is a fragmentary side elevational view of a dumping wagon incorporating the invention, the box and the lifting levers being shown in phantom lines in dumping position and the side sill on the near side of the chassis being broken away.

Fig. 2 is a top plan view of the wagon with the box removed to more clearly illustrate the invention, the side rails of the box being shown in phantom lines.

Fig. 3 is a top plan view of the jack.

Fig. 4 is a side elevational view thereof with the cylinder unit connected thereto and the jack shown in raising position, Fig. 5 is a fragmentary side elevational view of a portion of a jack showing the parts thereof in the lowering position, and Figure 6 is an enlarged fragmentary elevational view of the jack showing the parts thereof in raising position.

In certain of these views, parts may be omitted where shown in others in order to clarify the illustrations.

Describing the invention in detail, and referring first to Fig. 1, the invention is illustrated in connection with a conventional farm wagon, although it will be realized that the invention is applicable to other vehicles. The wagon comprises a wagon box generally indicated 2, the box including a frame having a side rail 4 at each side thereof supporting the floor or loading platform (not shown) of the box. The rails 4, 4 are metallic beam members and are interconnected intermediate their ends by braces 6, 6. Each beam member 4 is connected by means of a hinge 8 to a rear bolster 10 of the chassis frame generally indicated 12 and more specifically described in a co-pending application Serial No. 187,469, filed September 29, 1950, for Power Farm Wagon in the name of Russell R. Raney. The hinges 8 permit the box to be tilted by raising the forward end of the box so that it may discharge from the rear end thereof. The box is preferably provided with a suitable tail gate to contain the load in hauling position of the box as will be readily understood by those skilled in the art.

The bolster 10 extends between the rear wheels 14, 14 of the vehicle which are journaled on axles 16, 16 respectively connected to the respective ends of the bolster 10. The bolster 10 is connected to a pair of horizontal, longitudinally extending, laterally spaced side sill beam members 18, 18, the sill beam members being joined at their forward ends by a transverse front bolster 20 which affords pivotal connections 22, 22 at opposite ends to a steering frame 24 mounting front wheels 26, 26 of the wagon. The steering frame 24 and/or the front bolster may be suitably connected in conventional manner, and as readily apparent in Figs. 1 and 2, to a coupling member or draw bar 28 which is adapted for connection to an associated tractor (not shown).

The raising and lowering mechanism for the box comprises a transverse pivot member or shaft 30 connected at opposite ends by brackets 32, 32 to the beam members 18, 18 intermediate the ends thereof. The pivot member 30 is disposed above the sills 18, 18 and pivotally mounts a pair of triangular levers 34, 34 intermediate their ends, said levers 34, 34 extending lengthwise of the vehicle in lowered position of the box and diverging toward their front ends, said front ends thereof extending to adjacent the sides of the wagon. The front ends of the levers 34, 34 are interconnected by a bar or rod 36 which is offset upwardly intermediate its ends as at 38 between the levers 34, 34 for a purpose hereinafter described.

The rod 36 rotatably carries a roller 40 at each end thereof outwardly of levers 34, the rollers being disposed beneath respective side rails 4. It will be seen that the rod 36 causes both levers 34, 34 to act together and maintains the levers 34, 34 spread apart. The extent of the rod outwardly of the levers on which the lifting force is applied is as short as possible to its area of load transfer through the rollers to the rails of the wagon box so that bending effect on the rod 36 is reduced to the minimum.

The other ends of the levers 34, 34 are interconnected by a pivot member or pin 44, the pin 44 rotatably mounting sleeve structures 46, 46 which serve as spacers for the levers 34, 34, the sleeves being connected directly and by suitable gussets 48, 48 which may be welded thereto, to the outer or rear end of a rack bar 50 of a mechanical jack generally designated 52.

The bar 50 of the jack telescopes at its other or forward end into the rear end of a frame 54 of the jack, the forward end of the frame 54 being pivoted on a substantially horizontal axis by a pin 56 to a bracket on the rear side of the front bolster 20 substantially centrally thereof.

The jack 52 comprises a forked operating lever 60 pivoted intermediate its ends as at 62 to the jack frame 54, the lever 60 being disposed substantially vertically and having its upper end pivotally connected as at 64 to the outer end of a piston rod 66 of a piston (not shown) reciprocating within a cylinder 68. The cylinder 68 is disposed substantially horizontally and extends longitudinally of the wagon and has the stem 66 extending from the rear end thereof, the front end of the cylinder 68 being pivoted as at 70 to a lug structure 72 formed on the forward end of the jack frame 54. The hydraulic cylinder structure 66, 68 may be actuated by a hydraulic circuit generally indicated 74 including a pressure responsive automatic reversing valve, the circuit including a hydraulic pump and reservoir such as is common on a farm tractor as well known to those skilled in the art and of the type shown in U. S. patents, 2,427,871 and 2,454,684.

The hydraulic cylinder unit 66, 68 is identical with that shown in a co-pending application of Joseph F. Ziskal, Serial No. 98,222, filed June 10, 1949, by Hydraulic Power-Lift and Movement Limiting Control Therefor, now abandoned and the subject matter thereof is continued in a subsequent continuation-in-part application now U. S. Patent 2,606,532.

In operation, assuming that the wagon box 4 is in hauling position, the levers 34, 34 are disposed generally horizontally and extend longitudinally of the wagon. In this position it will be seen that the reason for offsetting the center portion 38 of the rod 36 is to provide clearance over the piston stem 66. To raise the wagon box the jack is caused to retract whereby the levers 34, 34 are caused to rotate in a counterclockwise direction (Fig. 1) about the axis 30 whereby the forward ends of the levers are elevated and the rear ends are lowered as seen in phantom lines in Fig. 1. It will be seen that at the initiation of raising the forward end of the box the levers exert the lifting force through the rollers 40 to the rails 4 at areas spaced a maximum distance from the pivots 78 of the hinges 8. This distance constantly decreases as the box is gradually moved up, the rollers rolling rearwardly on the rails 4 toward the pivots 78. It will be seen that with each succeeding retraction step of the jack, the speed of lifting the front end of the box increases and the leverage angle of the struts 34 is proportionately decreased. This is extremely desirable to accelerate the unloading of the wagon and the combination accomplishes this function without overstressing the parts inasmuch as the load is constantly decreased.

The jacking arrangement for extending and retracting the jack comprises a control link 80 pivoted at one end as at 82 to the lower end of the operating lever 60. The link 80 moves at its other end a pin 84 which operates within a slot 86 in a carrier 87 and slot 89 in a cam member 88 carried by the frame 54. Lever 60 is also pivoted at 82 to a spring biased operating dog 90 which is arranged to engage the teeth 92 of rack bar 50. The rack bar 50 is also engaged by a holding dog 94 pivoted on the frame 54 and spring biased to engage teeth 92. To move bar 50 into the frame 54, the reversing link 96 which is pivoted at 98 to the frame 54 is actuated to move the cam member 88 against the resistance of the spring 100, carried by the frame 54, to inoperative position as shown in Fig. 4. As the lever 60 oscillates back and forth by the action of the cylinder unit, the operating dog 90 initially urges the bar 50 into the frame until the holding dog 94 slides over and is disposed behind the succeeding tooth 92. This action takes place when the lever 60, as shown in Fig. 4 is rotated to its extreme position in a counterclockwise direction. At the end of this stroke of lever 60, the dog 94 has advanced one tooth while the tooth initially engaged by dog 90 is still engaged thereby. The lever 60 is then rocked in the reverse or clockwise direction whereupon the load is entirely transferred to the holding dog 94, the dog 90 sliding over the succeeding tooth whereby at about the end of this counterclockwise stroke of the lever 60, the dog 90 is snapped in front of the succeeding tooth. The action heretofore described on the reverse or clockwise stroke of the lever 60 is repeated until the desired retraction of the jack is obtained.

In order to lower the wagon box, the jack is extended. The reversing link 96 is rotated out of engagement with the cam member 88 whereupon the cam member 88, is actuated by the spring 100 to operative position.

As will be readily understood by those skilled in the art, the cam member 88 is caused to rock in a generally vertical plane during oscillation of lever 60 in view of the position of pin 84 and the enlargement at 102 of slot 89 at one end of member 88 and also the position of the arcuate slot 104 and limiting horizontal pin 106 therethrough at the other end of cam member 88. The cam plate 88 alternately depresses one dog or pawl from the rack at one end of the stroke of lever 60 and the other dog or pawl at the other end of the stroke. The operation may be followed with reference to Figure 5 wherein the lever 60 is initiating counter-clockwise rotation. The dog 90 rides on the bottom bulbous edge of the adjacent end of the cam member thereabove which is urged into engaging position with the dog by spring 100. As lever 60 is advanced in counter-clockwise direction, the link 80 moves pin 84 to the right end of the narrow section 89 of the slot 88 while simultaneously dog 90 moves into the cut-out section of the intermediate section of the lower edge of the cam member and picks up the succeeding tooth 92 of the rack 50. Further counter-clockwise rotation of the lever 60 enters the pin 84 into the enlargement 102 whereupon the right end of the cam member is urged downwardly by the spring 100 against the dog 94 to release it from the tooth engaged thereby. This release occurs when lever 60 reaches the end of its counter-clockwise stroke, whereat dog 90 is caused to push the rack 50 slightly into the member 54 to release the load from dog 94. On return of lever 60 in a clockwise direction, the pin 84 is withdrawn from enlargement 102 and guided into the narrow section 89. This raises the right end of the cam member and accommodates entry of dog 94 into the succeeding tooth which has moved thereto by the bar 50 moving with dog 90 to extend the jack. This action is conventional in mechanical jacks and in the present instance permits extension of the jack whereby levers 34, 34 are rotated in a clockwise direction by the weight of the box to the hauling position shown in Fig. 1.

It will be appreciated that the invention provides an efficient unloading mechanism of simple design which effects the intended objects.

What is claimed is:

1. A vehicle comprising a support frame, a body superposed thereon and pivoted on a substantially horizontal axis at its rear end to the rear extremity of the frame, means for rotating the body about said axis and including a lever assembly beneath the body and pivoted between its ends to the frame intermediate the ends thereof, said assembly in the hauling position of the vehicle extending longitudinally of the frame and at one end movably engaging the body adjacent to the forward end thereof forwardly of the axis of pivot of the assembly to said frame, a jack extending longitudinally of said frame and having one end pivotally connected to the forward end of the frame and the other end pivoted to said assembly on an axis disposed generally parallel, rearwardly and below the pivot of the assembly to the frame, said jack including telescoping elements, means for expanding and retracting said element with respect to each other and including an operating lever, and a short stroke reciprocating hydraulic motor disposed alongside said jack and connected at one end to said operating lever and at the other end to the front end of the frame.

2. A dump vehicle comprising a chassis, a box carried thereby and pivoted adjacent to its rear extremity on a generally horizontal transverse axis to the rear end of said chassis, and means for lifting and lowering the front end of the box about the axis and comprising a pair of bellcrank levers arranged longitudinally in a V with the apex thereof directed rearwardly of the chassis, said levers pivoted on an approximately horizontal axis intermediate their ends to said chassis between the ends thereof, the forward ends of said levers being disposed in the lowered position of the box adjacent to the forward end of the box, means on said forward ends of the levers adapted for movable supporting engagement with the box, a connection between the rear ends of said levers forming the apex of the V, a jack comprising telescoping elements and extending longitudinally of the vehicle between said levers and substantially bisecting the V, one of said elements pivotally connected at its free end to said levers at said apex and the other element pivoted at its free end to the forward end of the chassis, the pivot of said one element with the levers being at all times located below the axis of pivot of the levers to said chassis and said jack sloping axially downwardly rearwardly from its pivot to the front end of the chassis, means for retracting and extending said elements with respect to each other and including an upwardly projected operating lever located intermediate the ends of the jack, a hydraulic motor comprising piston and cylinder members positioned above the jack, one of said members pivoted to the upper end of the operating lever and the other of said members pivotally connected to said other element of said jack.

3. In a dumping vehicle, a chassis, a box thereon and tiltably connected at its rear end to the rear end thereof, a lifting and lowering assembly for the box disposed therebeneath and comprising a lever unit pivoted on a generally horizontal axis intermediate its ends to intermediate the ends of the chassis and in the lowered position of the box extending longitudinally of the vehicle with the front extremity thereof beneath the front end of the box and the rear extremity rearwardly and below said axis, a jack pivoted at one end to said rear extremity of the lever unit and at its other end pivoted to the front end of the chassis and in the lowered position of the box extending diagonally downwardly rearwardly, means for extending and contracting said jack and including an operating lever positioned intermediate the ends of the jack and extending upwardly thereof, and a piston and cylinder assembly overlying said jack and having one end pivoted to the upper end of said operating lever and its other end pivoted to the front end of said jack at a point in close proximity thereto, said downward rearward inclination of the jack accommodating the disposition of said piston and cylinder unit substantially horizontally in the lowered position of said box whereby effecting a compact arrangement.

4. For an arrangement of the class described, a tension jack including longitudinally telescoping elements, one of which is hollow and the other toothed, an operating assembly mounted on said hollow element and including a lever pivoted intermediate its ends to said hollow element, an operating dog pivoted to one end of the lever, spring means reacting between said operating lever and said operating dog and biasing the latter into engagement with a tooth of said toothed element, a spring biased holding dog carried by said hollow element and arranged to engage with a different tooth of said toothed element, said operating and holding dogs being separated longitudinally of the jack, a cam member extending longitudinally of the jack and having end portions engageable with respective dogs, spring means reacting between the cam member and said hollow element and loading the former in a direction towards said dogs, means for locking said cam member in inoperative position during retraction of said jack elements, said last mentioned means being releasable to permit said cam member to assume a working position for extension of said jack elements, and means for alternately releasing the holding and operating dogs from the teeth engaged thereby to permit said extension of said elements and comprising a cam-operating-link pivoted at one end to said lever at said one end thereof, a pin on said cam operating link extending into a longitudinal slot in said cam member, said slot having a narrow width snugly accommodating said pin and extending from one side of said spring means towards the adjacent end of the cam member at said holding dog, said slot at the last-mentioned end of said cam member being enlarged in a direction away from the holding dog to permit, with respect to the pin when entered into said enlargement of the slot, movement of the cam member into engagement with the holding dog to urge the same out of engagement with the adjacent tooth and into a position to catch behind the succeeding tooth while said other element is withdrawing from said hollow element concomitantly with said operating dog in engagement with an adjacent tooth, said pin being shiftable by the operating link moving with said lever into the narrow width of the slot to disengage said cam member from said holding dog to permit the holding dog to engage the succeeding tooth, said pin affording a fulcrum for the cam member when in said narrow width of the slot and in cooperation with said spring means to cant the end of the cam member adjacent to the operating dog into engagement therewith to disengage the operating dog from the adjacent tooth and position the same to catch behind the succeeding tooth, and means for limiting said canting movement of said cam member.

5. The arrangement according to claim 4 and including an hydraulic motor comprising a short stroke reciprocating piston and cylinder assembly operatively connected to the other end of the lever.

VICTOR J. KOMUCHAR.

References Cited in the file of this patent

UNITED STATES PATENTS

| Number | Name | Date |
|---|---|---|
| 1,264,460 | Wallace | Apr. 30, 1918 |
| 1,394,113 | Page | Oct. 18, 1921 |
| 1,455,528 | Hansen | May 15, 1923 |
| 1,459,209 | Hough | June 19, 1923 |
| 1,943,050 | Beath | Jan. 9, 1934 |
| 2,018,148 | Pfauser | Oct. 22, 1935 |
| 2,437,656 | Steenhoven | Mar. 9, 1948 |
| 2,467,056 | Schmidtke | Apr. 12, 1949 |

FOREIGN PATENTS

| Number | Country | Date |
|---|---|---|
| 172,175 | Great Britain | Dec. 8, 1921 |